April 25, 1933.　　O. A. BANNER　　1,905,431
SHAFT COUPLING
Filed Nov. 3, 1931　　2 Sheets-Sheet 1

INVENTOR
Otto A. Banner
BY C. Campbell Branch
ATTORNEY

April 25, 1933.  O. A. BANNER  1,905,431
SHAFT COUPLING
Filed Nov. 3, 1931  2 Sheets-Sheet 2

INVENTOR
Otto A. Banner
BY C. Campbell Hinricks
ATTORNEY

Patented Apr. 25, 1933

1,905,431

UNITED STATES PATENT OFFICE

OTTO A. BANNER, OF HIGHLAND PARK, NEW JERSEY, ASSIGNOR TO JOHN WALDRON CORPORATION, OF NEW BRUNSWICK, NEW JERSEY, A CORPORATION OF NEW JERSEY

SHAFT COUPLING

Application filed November 3, 1931. Serial No. 572,743.

This invention relates to couplings.

In order for a coupling to function properly, it should be able to transmit power from one shaft to the other not only when the shafts are in alinement, but also when the axes of the two shafts are displaced. Such a displacement may be a parallel or an angular one or both types of displacement may occur at the same time. Such conditions of displacement arise through various causes, the bearings supporting the shafts may wear, the foundation structure of the bearings may distort, etc. Many couplings have been devised that will take care of only one or the other of the forms of misalinement. Since it seems, generally speaking, easier to design a coupling for angular misalinement, some couplings have been devised whereby the parallel misalinement is changed into angular misalinement. The coupling which I have invented belongs to this class.

A coupling should not only be able to transmit the power under reasonable misalinement but should also have a long life and should be easy to manufacture as well as be light in weight and capable of operation in reduced spaced conditions. The element of operation in reduced spaced conditions is frequently overlooked and as the adjacent space surrounding a coupling is often limited the assembly is then difficult. I have designed a coupling which incorporates all these features, it has the necessary misalinement capacity, is economical to produce, easy to install, and embodies the important feature of protection against wear and operation which I obtain by keeping the contacting load carrying parts immersed in a bath of lubricant when the coupling rotates.

In designing a coupling, the primary determining element for the transmission of a given horsepower are the dimensions of the bore and the length of the hub. The transmission of a given torque requires a certain shaft diameter. To take off this torque from the shaft and transmit it to other members requires a certain weight of metal which has been determined by experience and which must be incorporated in a hub so that the diameter of the hub and its length have to be certain minimum dimensions. The method of torque transmission from one hub to the other constitutes the specific differences in coupling design. It is clear that a design embodying at the same time a minimum expense of material and labor to produce these elements leads obviously to the most economical and the most desirable coupling if it fulfills at the same time the strength requirements of torque transmission without undue wear and ability to carry a satisfactory amount of misalinement.

I have also found that it is particularly desirable to reduce the number of transmission elements between the two hubs to a minimum number and minimum weight. It is also desirable that elements forming the coupling shall be designed so as to be possible of manufacture upon standard machines and tools and by standard and well known generating processes. Such elements can be actually made more cheaply and yet with great accuracy.

One of the objects of this invention is to provide a coupling which will transmit power from one shaft to another whether the shaft is in alinement or misalined and whether such misalinement is parallel or angular or both.

Another object of the invention is to provide a coupling wherein the power is transmitted positively.

A still further object of the invention is to provide a coupling of such strength as to satisfactorily transmit power.

Another object of the invention is to provide a coupling that will satisfactorily function to transmit power over relatively greater misalinement than the usual coupling.

A further object of the invention is to provide a coupling that may be more easily removed where the space adjacent the coupling is small.

A still further object of the invention is to provide a coupling that can be readily lubricated with consequent greater wearing qualities.

A still further object of the invention is to provide a coupling that will be relatively cheap to manufacture and which will function for light or heavy loads.

Referring to the drawings.

Figure 1:
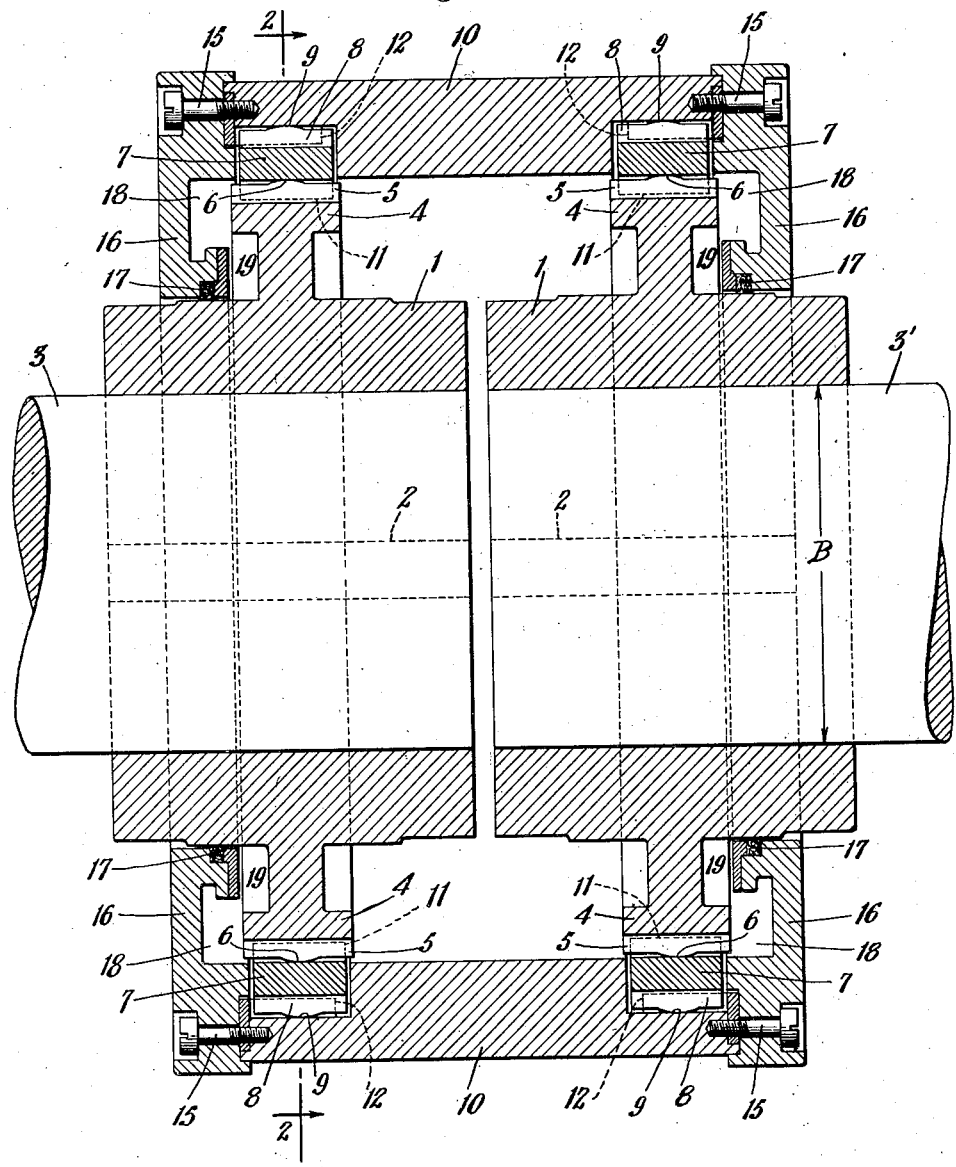
Figure 1 is a view in longitudinal section of a device embodying the principles of my invention.
Figure 2:
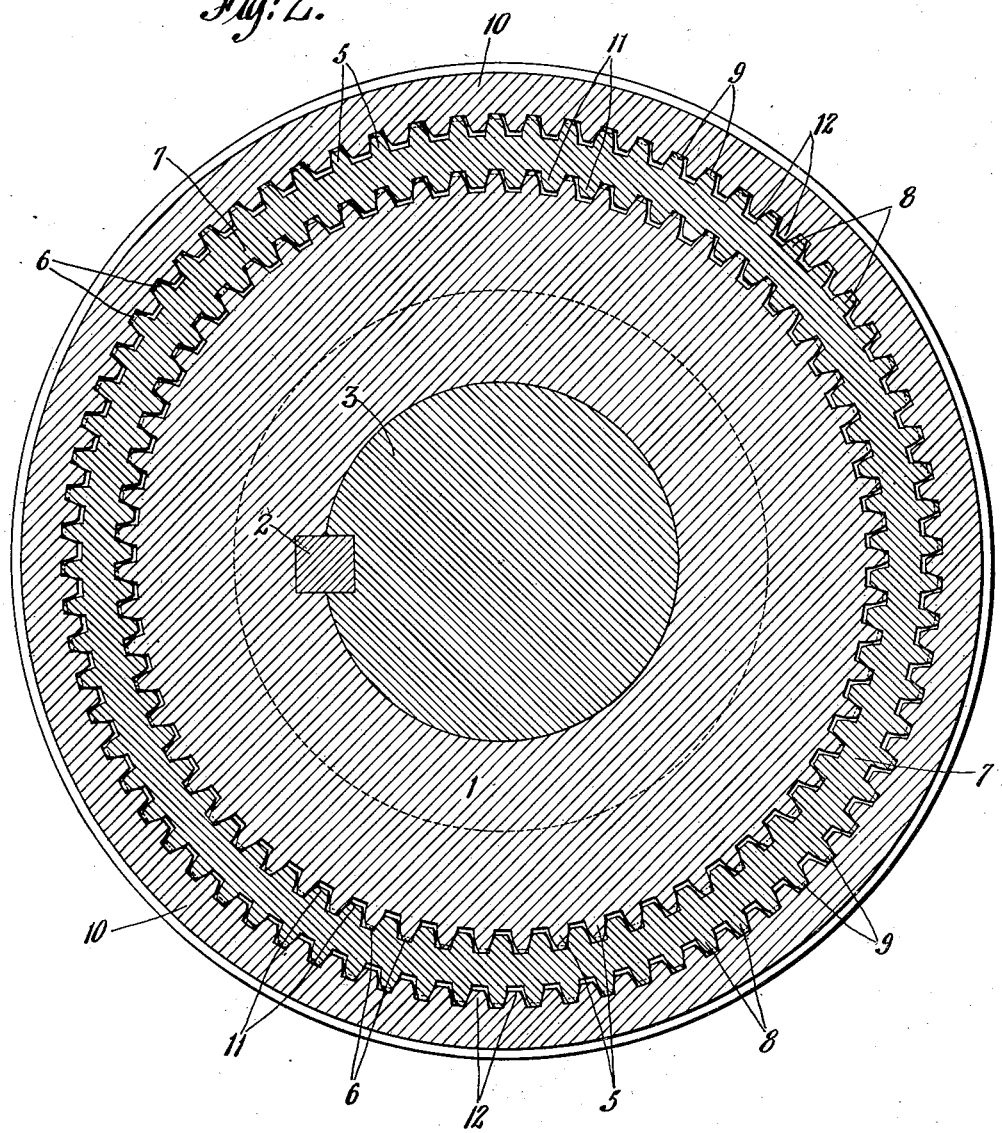
Figure 2 is a cross sectional view along the line 2, 2, of Figure 1, looking in the direction of the arrows.

In carrying out my invention, I propose to provide hubs 1 secured in any well known manner such as by keys 2 to shafts 3, 3'. Integral with hubs 1 are rims 4, terminating in involute teeth 5. These teeth centrally have a raised portion 6, forming a bearing surface for the torque rings 7. Torque rings 7, likewise have involute teeth 11, meshing with said hub teeth 5, and are carried or borne by the raised portions 6. Torque rings 7, likewise have involute teeth 8 upon their outer circumference and these teeth likewise have a center raised portion 9, to support the cover 10. The support of cover 10 on the raised portion or crest 9 of teeth 8 of torque ring 7 and the support of torque ring 7 on the crest or raised portions 6 of hub teeth 5 on rims 4 of hubs 1 have considerable advantages over the support on the hub as I have found by experiment. Secured in any well known manner such as by bolts 15 to cover 10, are cover plates 16.

Upon the bearing surface of plates 16 against hub 1, I propose to provide for retaining the oil within the cover plates 16, means such as piston rings 17, or other form of retaining means. Within cover plates 16, I provide oil chambers 18, and to form within the hub 1, and extending concentric rings 4, additional chambers 19 for the oil. These communicating chambers will be of sufficient size to retain enough oil to maintain a film of oil upon the intermeshing teeth. As the movement of the teeth, under misalinement, is not only rotative but also lateral there is a wiping action to spread the oil. The maintenance of a sufficient depth of oil immersion of the teeth when the coupling is operating is of great importance. If this immersion is not sufficient some air will be drawn in with the oil into the clearances of the teeth under the movement of the teeth when the shafts are in misalinement. Under these conditions, there is a foaming mixture of oil and air formed and in consequence insufficient thickness of oil film occurs between the contacting surfaces. It should be noted that the coupling may be positioned where the one end of the coupling has no free space for removal, thus making the coupling available under many conditions wherein other couplings could not be used.

In cases where the shaft 3 is parallel to shaft 3', but the centers of the two shafts are not in alinement, the teeth of the two hubs will no longer be parallel. As previously stated, there is only angular misalinement between cover and hubs to be considered, the parallel misalinement being resolved into angular. Under such conditions theoretically only two teeth carry the load, all the other teeth being out of contact. The two teeth on the hub ninety degrees apart from the load carrying teeth are located in the center of the tooth gap and having equal clearance on each side. This condition actually exists in a dry coupling carrying a small load. But when the coupling is filled with lubricant the conditions change radically because the oil forms a film which separates the faces of the teeth of the hub and the teeth of the torque ring and a greater number of teeth are in contact through the oil film. If proper lubrication is had, contacting may be throughout the teeth of both hubs with the teeth of the torque ring. The explanation of the maintenance of the oil films I believe to be due to two things: First the speed of rotation which generates a hydraulic pressure which forces the lubricant into the clearance spaces between the teeth, and secondly the pumping or breathing action due to the motion of the teeth during the rotation of the coupling. By reason of the contacting of a greater number of teeth the efficiency is increased and lighter weight elements may be used.

The maximum misalinement that can be carried by any gear coupling is:

(a) A function of the angle at which the cover can cock relatively to the hub. This angle is a function between the physical amount of misalinement and the distance of the teeth of the hubs. We have tan $$\alpha = \frac{m}{L}$$

where $m$ equals the amount of misalinement in inches, and $L$ equals the distance between the center of the teeth of the two hubs, and (b) The effect of the oil film.

With respect to the thickness of the oil film it can be stated that this is primarily dependent upon the physical properties of the lubricants used. Assuming the same lubricant to be used in the old style gear type and my new torque ring coupling, there would be no difference so far as the function of the oil is concerned, but it is quite obvious that the introduction of the torque ring means that the center distances of the teeth can be actually reduced to one-half of the amount found admissible in the old type couplings. Or in other words, for the same size coupling practically double the amount of misalinement can be carried by my coupling.

I propose to make the teeth of the torque ring shorter than the teeth of the cover and longer than the teeth of the hub rims. This forces cover 10 to cock against the torque ring teeth upon misalinement of the shafts. The effect of this arrangement with small misalinements is first that the hubs and rings form one unit, the cover cocking against the external teeth of the rings. After the misalinement has increased so much that the tooth clearance of the external ring teeth is completely taken up by the cover teeth, cover and rings will form a unit which is now cocking against the hub teeth. In addition, control of the cocking of the torque ring with respect to the teeth on the hub rims 4 may be determined by the clearances between the side walls of torque ring 7, cover 10 and cover plate 16. In other words, it is possible to predetermine when the cocking shall be transferred from the outer teeth to the inner teeth of the torque ring.

I have provided ample storage space for sufficient lubricant since it is necessary that the teeth should be immersed below the roots of the internal teeth of the hubs. It should be noted that even under conditions of extreme neglect the teeth of the cover and outer teeth of the rings will receive sufficient lubrication and as, except for extreme cases of misalinement the cocking of the cover will be taken care of by the clearances between the teeth of the cover and the outer teeth of the torque rings. This feature safeguards the life of the coupling.

I have found that it is advantageous to make the sets of contacting teeth of different material, preferably one set of teeth considerably harder than the other. In such cases there will be no galling or scoring of teeth and the harder teeth tend to smooth the surfaces of the softer teeth. This is readily accomplished in my structure since the large and heavier portions such as the cover and the hubs may be made out of the ordinary materials customarily used for such parts, while only the torque ring, a relatively small element, can be made of high grade materials such as chrome-molybdenum steels or nitralloy.

Quite an important item in the application of any coupling is the ability or provision made for accurately lining up the shaft ends. Any coupling will stand up best and have the least wear so long as the shafts are in perfect alinement. Misalinement carrying capacity or ability is an important and necessary requirement because in actual operation conditions arise which very often wear the shafts loose from their original perfect alinement. Such conditions may be for instance, bearing wear, deformation or setting of the foundations and supports, etc.

It is obvious that to establish the best operating conditions initially, means must be provided to accurately line up the shafts. Such means are usually provided at the inner ends of the hubs of the couplings. These ends are turned or ground accurately to the same diameter and concentric with the bore B. Using straight edges, feelers and wedges, an accurate lining up may easily be obtained. The old type couplings are so constructed that the covers are divided at the center in order to move them sideways for lining up purposes. This division tends to make the covers very costly to manufacture and it must be remembered that the bolts connected to the two flanges have to carry the full torque load. Also it must be considered that this flange must be made oil tight. In my construction, due to the short distance between the center of teeth on the hubs, the cover can be made in one piece whereby a great amount of weight, labor and trouble is saved and the diameter of the coupling reduced, while the actual space requirements for lining up the shafts after assembly and shafts are brought into position are considerably less than with an ordinary gear type coupling of the same power.

What I claim is:

1. A coupling for shafts, comprising two hubs, gears on said hubs, torque ring gears cooperating with said hub gears, a cover, gears within said cover cooperating with said torque ring gears, spaced abutments within said cover to permit the cover to cock with respect to the torque ring gears until a predetermined tilting angle is reached, said abutments in predetermined spaced relationship with respect to said torque rings for said abutments to tilt said torque rings with said cover when said cover has titlted beyond a predetermined angle with respect to said hubs.

2. A coupling for shafts, comprising two hubs, gears on said hubs, torque ring gears cooperating with said hub gears, a cover, gears within said cover cooperating with said torque ring gears, the teeth of said cover gears of lesser width than the cooperating teeth of the torque ring gears, spaced abutments within said cover to permit the cover to tilt with respect to the torque ring gears until a predetermined tilting angle is reached, said abutments in predetermined spaced relationship with respect to said torque rings for said abutments to tilt said torque rings with said cover when said cover has titled beyond a predetermined angle with respect to the hubs.

3. A coupling for shafts, comprising two hubs, gears on said hubs, torque ring gears cooperating with said hub gears, a cover, gears within said cover cooperating with said torque ring gears, abutments within said cover to limit the degree of tilt of the torque ring gears with respect to said cover to a predetermined angle and to cause said torque ring gears to tilt with respect to said hub gears when said limit is reached.

4. A shaft coupling, comprising two hubs, gears on said hubs, torque ring gears cooperating with said hub gears, a cover, gears within said cover cooperating with said torque ring gears, said cover having radial extensions for said torque rings and forming spaced abutments to permit angular inclination of the center plane of the torque rings to a limited amount with reference to the hub and cover gears.

5. A shaft coupling, comprising two hubs, gears on said hubs, torque ring gears cooperating with said hub gears, a cover, gears within said cover cooperating with said torque ring gears, means carried by said cover whereby the angular inclination of the center plane of the torque rings with reference to the hub and cover gears is limited.

6. A shaft coupling comprising two hubs, gears on said hubs, torque ring gears cooperating with said hub gears, a cover, gears within said cover cooperating with said torque ring gears, means to limit the angular inclination of the torque rings relatively to the cover to a predetermined amount when the coupling is misaligned.

7. A shaft coupling comprising two hubs, gears on said hubs, torque ring gears cooperating with said hub gears, a cover, gears within said cover cooperating with said torque ring gears, said cover extending radially inwardly and having end plates in spaced relationship with respect to said extension, said end plates and extension forming recesses for the torque rings and abutments to limit the angular inclination of the torque rings.

8. A shaft coupling, comprising two hubs, gears on said hubs, torque ring gears cooperating with said hub gears, a cover, gears within said cover cooperating with said torque ring gears, the teeth of said cover gears being of lesser width than the meshing teeth of the torque ring gears, and means to limit the angular inclination of the torque rings to a predetermined amount when the coupling is misaligned.

Signed at New York in the county of New York and State of New York this ninth day of October A. D. 1931.

OTTO A. BANNER.